US007576693B2

(12) United States Patent
Morris

(10) Patent No.: US 7,576,693 B2
(45) Date of Patent: Aug. 18, 2009

(54) POSITION DETERMINATION BY DIRECTIONAL BROADCAST

(75) Inventor: Martin Morris, Vista, CA (US)

(73) Assignee: Free Alliance SDN BHD, Kuala Lumpur (MY)

( * ) Notice: Subject to any disclaimer, the term of this patent is extended or adjusted under 35 U.S.C. 154(b) by 114 days.

(21) Appl. No.: 11/388,280

(22) Filed: Mar. 24, 2006

(65) Prior Publication Data
US 2007/0222679 A1   Sep. 27, 2007

(51) Int. Cl.
*G01S 1/08* (2006.01)
*G01S 13/00* (2006.01)
*G08B 5/22* (2006.01)

(52) U.S. Cl. ............... 342/407; 342/30; 340/825.37
(58) Field of Classification Search ..................
342/357.01–357.017, 407, 30; 340/825.37
See application file for complete search history.

(56) References Cited

U.S. PATENT DOCUMENTS

| | | | | |
|---|---|---|---|---|
| 3,130,407 | A * | 4/1964 | Kramar | 342/407 |
| 4,316,190 | A * | 2/1982 | Cole | 342/39 |
| 4,868,544 | A | 9/1989 | Havens | |
| 5,089,822 | A * | 2/1992 | Abaunza et al. | 342/30 |
| 5,525,967 | A | 6/1996 | Azizi et al. | |
| 5,969,689 | A * | 10/1999 | Martek et al. | 343/758 |
| 6,016,080 | A * | 1/2000 | Zuta et al. | 331/25 |
| 6,181,253 | B1 * | 1/2001 | Eschenbach et al. | 340/825.37 |
| 6,278,396 | B1 * | 8/2001 | Tran | 342/29 |
| 6,985,103 | B2 * | 1/2006 | Ridderheim et al. | 342/30 |
| 2003/0233192 | A1 * | 12/2003 | Bayh et al. | 701/301 |
| 2005/0109845 | A1 | 5/2005 | Ghaffari | |
| 2005/0192027 | A1 | 9/2005 | Kim et al. | |

FOREIGN PATENT DOCUMENTS

WO PCT/US2007/012815     8/2008

OTHER PUBLICATIONS

P. M.Mendes, 2003, IEEE, 0-7803-7846-6/03, 667-669 http://ieeexplore.ieee.org/iel5/8636/27400/01219324.pdf?arnumber=1219324.*

* cited by examiner

*Primary Examiner*—Thomas H Tarcza
*Assistant Examiner*—Harry Liu
(74) *Attorney, Agent, or Firm*—Saile Ackerman LLC; Stephen B. Ackerman

(57) ABSTRACT

Methods and systems to determine the position of objects indoors or in confined areas are disclosed. A multitude of broadcast stations are transmitting an omni-directional reference signal and directional signals having each a phase-shift depending upon their specific direction. The objects whose positions are to be identified have a transponder and a means to measure the phase-shift between the omni-directional reference signal and a directional signal received. The measured time-difference indicating the relative direction to the broadcast station, which has sent the directional signal, is sent back to the broadcast station. The absolute position of the object can be determined by the results of an angular measurement of a second broadcast station. The broadcast stations can communicate amongst each other. A post-processing unit can initiate actions according to the position of an object identified.

51 Claims, 2 Drawing Sheets

POSITION DETERMINATION BY DIRECTIONAL BROADCAST

BACKGROUND OF THE INVENTION (1) Field of the Invention

This invention relates generally to position determination and relates more particularly to methods and apparatus for determining the position of objects, which are located indoors or, outdoors in confined areas.

(2) Description of the Prior Art

A fast determination of the location of devices, objects, or machine is a difficult task, e.g. for the location of a nearest medical diagnostic device in a hospital or for the location of a moving device as e.g. a fork lifter or a robot in a big ware houses, etc. The requirements of accuracy vary for these different applications in the order of magnitude between 10 meter and less than 1 meter.

It is a challenge for the designers of systems for position determination to achieve low-cost systems having the accuracy required. There are known patents in the area of position determination.

U.S. Pat. No. (US 5,525,967 to Azizi et al.) proposes a system and method to monitor the specific location of a person, pet or item of personal property by employing elements that enable the user to pinpoint both the distance and the direction of the person or object being monitored relative to the position of the monitoring or transmission unit (the "source"), comprising a tracking transceiver unit, which tracks and monitors the person or object, and the target transceiver unit, which is worn or affixed to the person or object being monitored. The tracking transceiver unit broadcasts a signal to a target transceiver unit, which, upon receiving the signal, will then broadcast a response signal back to the tracking transceiver unit. The tracking transceiver unit's antenna, which comprises a plurality of flat sensor plate-like elements formed together in a generally spherical configuration, picks up the signal and then conveys the information it receives to a special response signal processor unit, which analyzes the data to determine the direction of the person or object being monitored. Information filtered and analyzed through the response signal processor unit is then conveyed to a central processor unit, which uses the data to calculate the distance of the person or object being monitored from the source.

U.S. Pat. No. (4,868,544 to Havens) discloses a shopping cart retrieval system being designed to allow search teams to detect and recover stolen or misplaced shopping carts. It consists of two distinct units of electronic equipment integrated together to form a retrieval system. The heart of the system is a VHF "beacon" radio transmitter implanted in the handle of the shopping cart which is continuously emitting a signal when it leaves the store. A search team, assigned the task of locating and recovering shopping carts, is equipped with a VHF radio receiver with both omni-directional antenna for detection of a shopping cart at maximum range, and a directional antenna used for the close-in location process.

U.S. Patent Application Publication (US 2005/0192027 to Kim et al.) discloses an apparatus for determining position information of one or more UEs (User Equipments), which includes a plurality of Node Bs for transmitting propagation signals to UEs positioned in a specific cell, and generating predetermined data for measuring position information of the UEs on the basis of propagation signals received from the UEs; a GPS (Global Positioning System) auxiliary information manager for generating and storing GPS auxiliary information associated with a specific cell using a GPS satellite signal received via a built-in GPS receiver; and a RNC (Radio Network Controller) connected to the plurality of Node Bs, for receiving GPS auxiliary information from the GPS auxiliary information manager in response to a request signal of at least one Node B from among the plurality of Node Bs, optimizing the received GPS auxiliary information for every Node B, selecting the optimized GPS auxiliary information, and periodically transmitting the selected GPS auxiliary information to the UEs using a multicast method, in which the Node Bs broadcast the GPS auxiliary information received from the RNC to the UEs positioned in a corresponding cell over a broadcast channel. The apparatus uses a multicast method to differently transmit individual GPS auxiliary information needed for different cells, so that transmission efficiency increases and UEs can more quickly determine their positions.

SUMMARY OF THE INVENTION

A principal object of the present invention is to determinate the position of objects indoors or in confined areas.

In accordance with the objects of this invention a method to determine the position of an object has been achieved. The method invented comprises, first, to provide a system comprising a multitude of broadcast stations, communicating among each other and one or more objects whose positions are to be determined wherein this object has a transponder, an identifying code, and a means to measure phase shifts of signals. The next steps of the method comprise to use the identifying code of an object, whose position is to be determined, as input in a nearest broadcast station and to broadcast from multiple broadcast stations an omni-directional reference signal and directional signals having each a phase shift characterizing their direction. The following steps of the method invented are to calculate the directions of said object relative to at least two of said broadcast stations using the phase difference between the reference signal and one of said directional signals measured at the object's site and to calculate the position of said object using the directions calculated in previous step, and to display the position of said object.

Also in accordance with the objects of this invention a system to determine the position of an object has been achieved. The system invented comprises, first, a multitude of broadcast stations comprising a transmitter broadcasting an omni-directional reference signal and directional signals in different directions wherein each of said directional signals has a specific phase-shift relative to said omni-directional reference signal, and a receiver receiving signals from an object whose position is to be determined, wherein said signals are related to the direction towards said object from a broadcast station. Furthermore the system comprises an object whose position has to be determined comprising a means to measure the time difference between said omni-directional reference signal and a directional signal received, and a transponder to receive said omni-directional reference signal and a directional signal and to transmit said time difference back to a broadcast station, which has sent said directional signal.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and apparatus for position determination of objects, which are located indoors or in confined areas.

Figure 1:
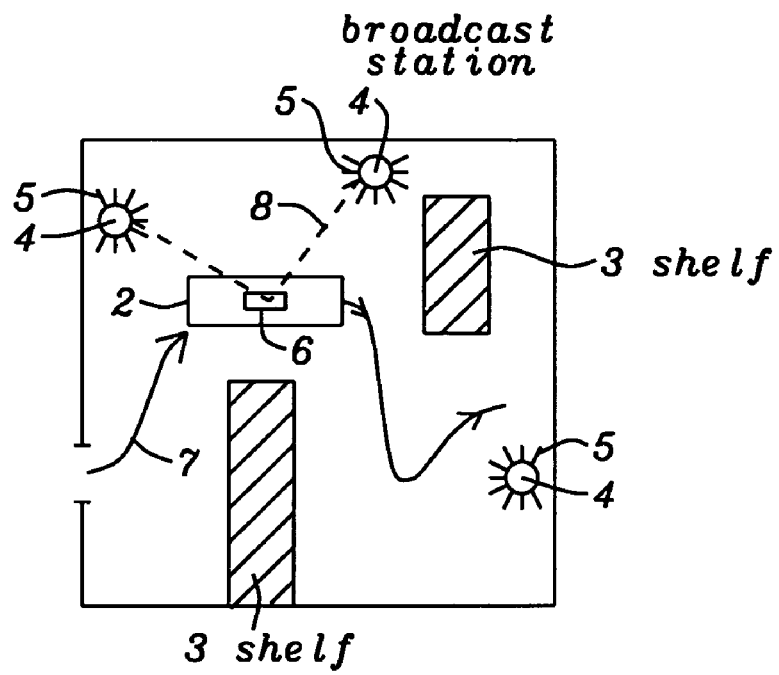
FIG. 1 shows a schematic diagram of an application of the position determination system invented.

There is a multitude of different applications of the present invention possible. FIG. 1 shows an application of the present invention in a warehouse floor 1. There are shelves 3 and boxes in this warehouse floor 1 and illuminating the total warehouse floor is very expensive. A forklift 2 has its course through the warehouse floor. Lights are turned on over the forklift 2 and lights are turned off behind it, so the forklift 2 moves in a pool of light. This is only possible if the location of the forklift is known. For this kind of application an accuracy of about 10 meters is required.

In order to determine the position of an object as e.g. forklift 2 multiple broadcast stations 4 are provided. A broadcast station 4 transmits two kind of signals, a first signal is a constant omni-directional reference signal and a second kind of signals are directional signals 8 wherein each of the signals has a specific phase shift depending upon their own specific direction relative to the omni-directional signal (only the directional signal hitting the forklift is shown). Each direction of the second signal has a different phase-shift. The signals are broadcasted in as many directions as required via a set of antennas 5 which are electronically switched. The frequency range used is in the order of magnitude of 6 GHz. Broadcasting in the frequency range of 6 GHz allow an antenna length of 1.2 cm according to wavelength/4 rule. A transponder 6 located on the forklift senses the phase difference between the two signals and the difference identifies different directions or "radials" from a broadcast station 4. The forklift is on one, and only one, radial from one broadcast station 4. The transponder 6 on the forklift 2 sends a value according to this radial back to the correspondent broadcast station. Using one broadcast station only would only result in the direction of the forklift relative to the broadcast station.

Adjacent directional signals are transmitted sequentially, therefore they don't interfere with each other. In case a transponder receives a strong directional signal and a weak directional signal interpolation is used to improve accuracy.

The accuracy of the system is mainly determined by the beam width of the directional signals. The beam width of the directional signals determines also the number of directional transmissions required.

In order to get distance information a second broadcast station is required in order to get a second direction (angle) and hence to calculate the distance using two angles.

Figure 2:
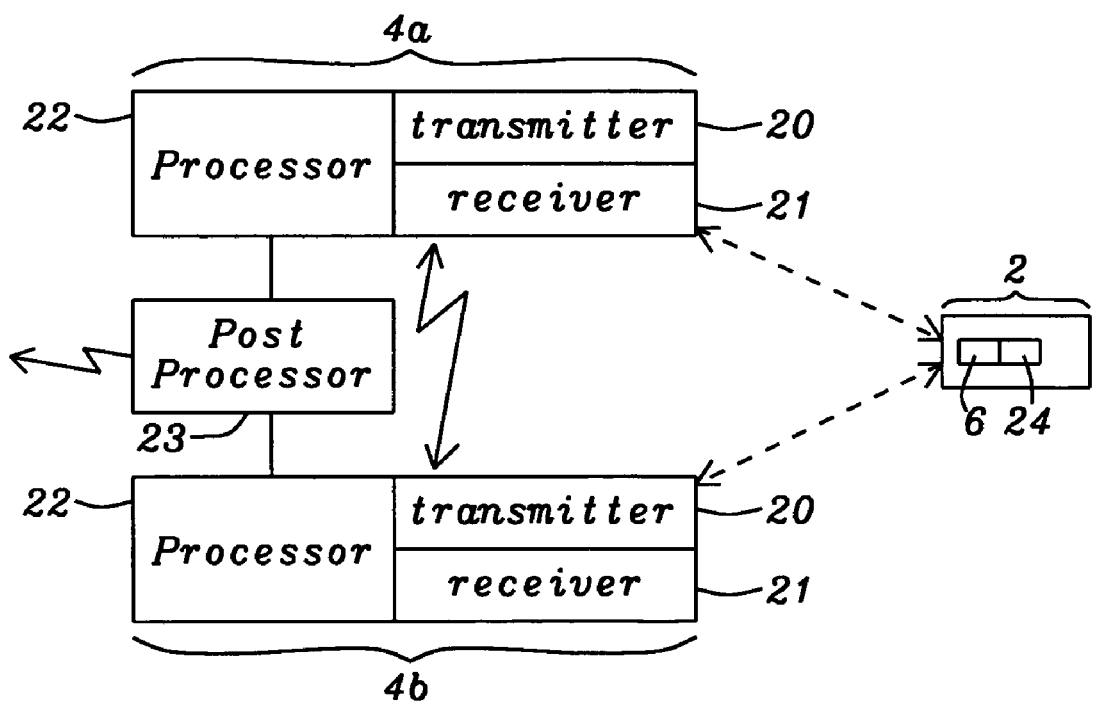
FIG. 2 shows a schematic block diagram of the major components of the system invented.

FIG. 2 shows a schematic block diagram of the system invented. Two broadcast stations 4a and 4b are shown. Each broadcast station 4a and 4b comprises a transmitter 20, a receiver 21, and a processing device 22. A post-processing unit 23 calculates the position of an object 2 and initiates actions correspondent to its position as e.g., using the example of the forklift described above, turn on the lighting in the area above the forklift and turn off the lighting behind the forklift. The application with a forklift is only one example among many other possible applications of the present invention. As described above broadcast station 4a sends two signals, a constant omni-directional signal and a signal varying its phase relative to the first signal depending upon its direction. A transponder 6 on an object 2, as e.g. a forklift has a means to measure 24 the phase difference between the two signals and the difference identifies different directions or "radials" from a broadcast station. The transponder 6 sends back the phase difference or its direction relative to the correspondent broadcast station 4a together with a transponder ID. It has to be understood that the positions of more than one object can be determined using the method described above and more than two broadcast stations can be deployed.

The calculation of the direction between a broadcast system and object requires angles from multiple broadcast station sites. In a preferred embodiment the direction between broadcast system and object, which is based on the phase difference measured at the object's site, is calculated at a broadcast station site. Alternatively this calculation could be performed at a post-processor site or even on the object's site. The calculation at the object's site requires the transmission of the angles to another broadcast site to the related object.

In a preferred embodiment the phase difference between the omni-directional signal and the directional signal is measured by a digital counter. Using internal clock cycles the counter times the relationship between zero crossings of the two signals. The accuracy of the measurement can be increased by utilizing the ratio between rising crossings of the two signals to the time between rising crossings of the reference signal, and averaging multiple measurements. Another option would be to delay the reference signal by a variable phase-shift in the analog domain until the signals coincide. The time-span of this delay is also a measure for the phase-shift.

A second broadcast station 4b sends also same kind of signals as the broadcast station 4a and transponder 6 sends back the directional information to 4b.

The identification by transponder 6, which broadcast station 4a or 4b has sent signals received, is made by externally synchronizing the broadcast stations 4a and 4b and a broadcast station ID would be by turns transmitted and periodically modulated onto the reference signal. Alternatively the identification could be performed by multiple frequencies used by broadcast stations 4a and 4b.

The directional information from stations 4a and 4b can be used to calculate the distance between object 2 and broadcast stations 4a or 4b using trigonometric equations. The position of the object can be determined having the direction of the object relative to a base station and the related distance. For this purpose the broadcast stations 4a and 4b communicate between each other to exchange the directional information received from object 2.

Preferably the broadcast stations communicate among each other using a wireless network of any standard type. A wireless network is easier to be installed than a network by wire, which is of course feasible as well.

Positions of more than one object can be determined easily be the system invented. Each broadcast station periodically transmits its identification ID. The responses of the transponders comprise the transponder ID and the results of the measurements.

The way post-processing node are used depends on the specific application of the position determination system invented. In case of the lighting application shown in FIG. 1 and if the broadcast stations are connected by a wireless network, a post-processing node could be located by each lighting controller controlling the lighting in the correspondent area. In other applications just one post-processing node would be sufficient Other non-limiting examples of an application of the present invention could be a search for items in a room or a search for expensive diagnostic devices in a hospital. It is an interrogating situation to find the location of a nearest specific device. The accuracy of such application is in the order of magnitude of 1 m, this means that more antennas would be required compared to the lighting example shown in FIG. 1.

In order to save battery power the transponder on the object or device searched for can be silent as long as its position is already known to the broadcast systems and is only active after it has been moved again to report its new position or when its position is to be determined. For this purpose the transponder would monitor messages embedded into one or more broadcast reference signals only when specifically requested would it return measurements. In case of a search for devices the post-processing system would instruct all broadcast stations, or those in a desired area, to ask each desired device to respond. Any response would be used as previously described to locate the device.

Furthermore a responder can be started to send its measurements after its object is moved around. This can be initiated by an acceleration meter. Another alternative could be that a transponders "sleeps" a defined period of time. After that period it wakes up and takes measurements, if its position has changed it reports the new measurement, otherwise it doesn't report anything and starts a new sleeping period.

In case the battery of the transponder is losing power the transponder can transmit an alarm to the broadcast stations.

A search can also be performed in multiple planes, as e.g. in multiple floors of a building. For this purpose in each plane a network of broadcast stations has to be implemented and these networks must be connected together. Depending on the size and construction of the building either a single WLAN 802.11b/g network or on each floor such a network will be implemented. In the latter case the networks of the individual floors have to be bridged together by a wired Ethernet.

Figure 3:
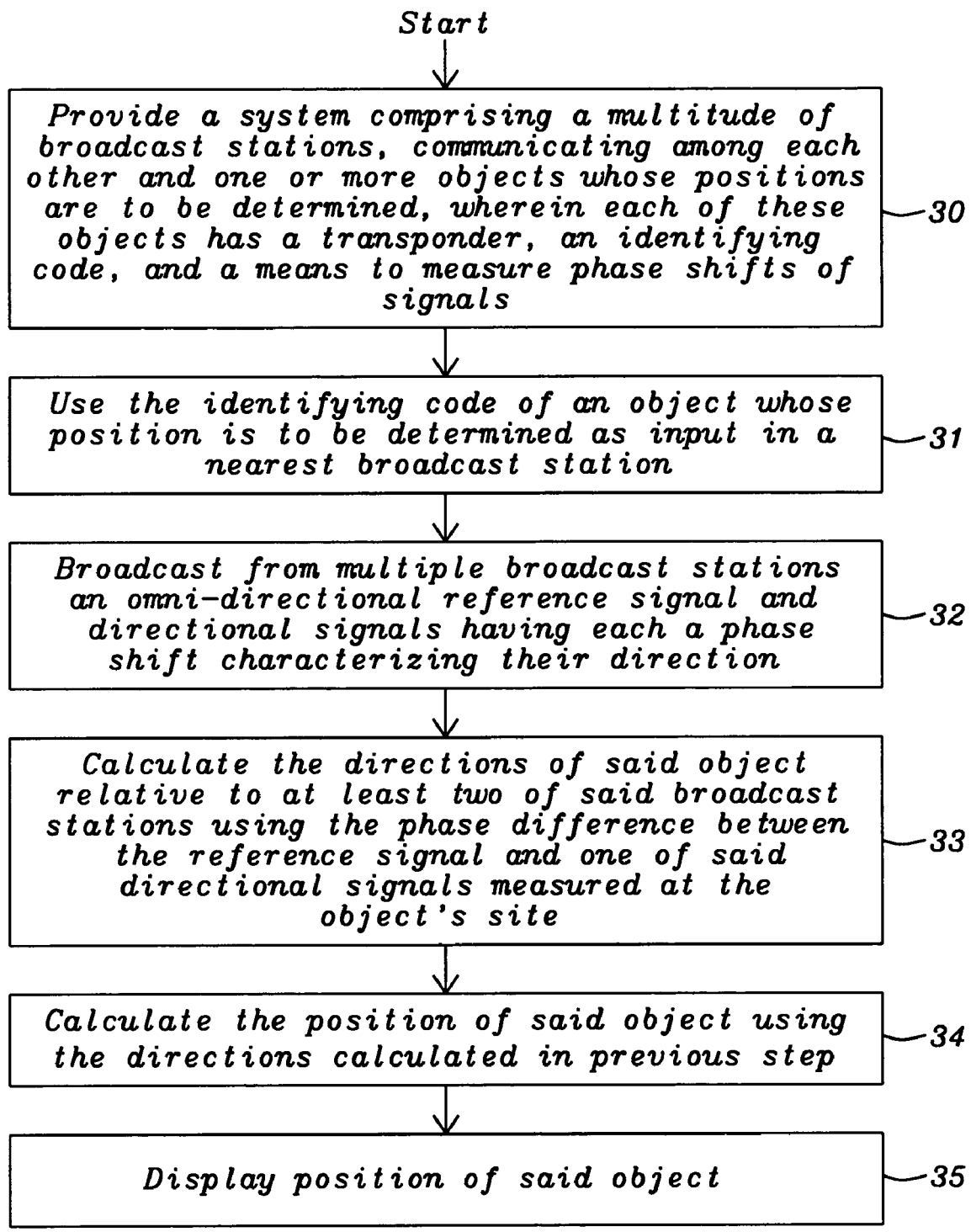
FIG. 3 illustrates a flowchart of a method for determining the position of an object.

FIG. 3 shows a flowchart of a method to determine the position of an object. Step 30 illustrates the provision of a system comprising a multitude of broadcast stations, communicating among each other and one or more objects whose positions are to be determined, wherein each of these objects has a transponder, an identifying code, and a means to measure phase shifts of signals. In the next step 31 this identifying code of an object whose position is to be determined is used as input in a nearest broadcast station. In the following step 32 an omni-directional reference signal and directional signals having each a phase shift characterizing their direction are broadcast from multiple broadcast stations. In step 33 the directions of said object relative to at least two of said broadcast stations using the phase difference between the reference signal and one of said directional signals measured at the object's side are calculated. In step 34 the position of said object is calculated using the directions calculated in previous step. In the last step 35 the position of said object is displayed.

While the invention has been particularly shown and described with reference to the preferred embodiments thereof, it will be understood by those skilled in the art that various changes in form and details may be made without departing from the spirit and scope of the invention.

What is claimed is:

1. A method to determine the position of one or more objects in a single plane comprising the steps of:
   providing a system comprising a multitude of broadcast stations broadcasting via antennas with a length in the order of 1.2 cm, communicating among each other and one or more objects whose positions are to be determined, wherein each of these objects has a transponder, an identifying code, and a means to measure phase shifts of signals;
   using the identifying code of each object whose position is to be determined as input in a nearest broadcast station;
   broadcasting inside or outside of buildings in a frequency range of 6 GHz from multiple broadcast stations an omni-directional reference signal and directional signals having each a phase shift characterizing their direction;
   calculating the directions of said object relative to at least two of said broadcast stations using the phase difference between the reference signal and one of said directional signals measured at the object's site;
   calculating the position of said object using the directions calculated in previous step; and
   displaying position of said object.

2. The method of claim 1 wherein said directional signals from adjacent broadcast stations are transmitted sequentially to avoid interference.

3. The method of claim 1 wherein relative directional signal strength is used to interpolate a direction in case a transponder receives two directional signals from a same broadcast station.

4. The method of claim 1 wherein an code identifying each broadcast station is embedded in the omni-directional reference signal.

5. The method of claim 1 wherein the calculation of a position of an object is performed by a broadcast station based upon the measurements provided by said transponder.

6. The method of claim 1 wherein the calculation of a position of an object is performed by a post-processing unit based upon the measurements provided by said transponder.

7. The method of claim 1 wherein the calculation of a position of an object is performed by said transponder.

8. The method of claim 1 wherein said phase difference is measured by a digital counter.

9. The method of claim 8 wherein said digital counter times the relationship between zero crossings of the omni-directional reference signal and the directional signal using internal clock cycles.

10. The method of claim 8 wherein for the measurement of the phase difference the ratio between rising crossings of the two signals to the time between rising crossings of the reference signal is used, followed by averaging multiple measurements.

11. The method of claim 1 wherein for the measurement of the phase difference the reference signal is delayed by a variable phase-shift in the analog domain until it coincides with a directional signal, wherein the time-span of this delay is a measure for the phase-shift.

12. The method of claim 1 wherein multiple frequencies are used to identify the broadcast stations.

13. The method of claim 1 wherein the broadcast stations are identified by externally synchronizing the broadcast stations and wherein a broadcast station ID is by turns transmitted and periodically modulated onto the omni-directional reference signal.

14. The method of claim 1 wherein the broadcast station communicate among each other using a wireless network.

15. The method of claim 1 wherein the broadcast station communicate among each other using a LAN network by wire.

16. The method of claim 1 wherein a transponder transmits its identification code and the results of the measurements taken at the object's site.

17. The method of claim 1 wherein for each broadcast stations a post-processing node is provided.

18. The method of claim 1 wherein a transponder is only performing measurement of phase differences and related transmission after a request by a message from a broadcast station, wherein this message is embedded in the omni-directional reference signal.

19. The method of claim 1 wherein a transponder takes the measurement of said phase difference only periodically after a defined time span and transmits the result only when said phase difference is different from a previous measurement.

20. The method of claim 1 wherein a transponder takes the measurement of said phase difference followed by a transmission of the measurement results when a physical movement of its object is sensed by an acceleration sensor.

21. The method of claim 1 wherein a transponder sends an alarm when its battery is losing power.

22. The method of claim 1 wherein more than one of said systems comprising broadcast stations are operated.

23. The method of claim 22 wherein these systems are interconnected by a WLAN network.

24. The method of claim 22 wherein these systems are interconnected by a LAN by wire.

25. A system to determine the position of an object in a single plane is comprising:
   a multitude of broadcast stations inside or outside of buildings each of them comprising:
      a transmitter broadcasting in a frequency range of 6 MHZ an omni-directional reference signal and directional signals in different directions wherein each of said directional signals has a specific phase-shift relative to said omni-directional reference signal;
      a set of antennas with a length in the order of 1.2 cm, and
      a receiver receiving signals from a transponder of an object whose position is to be determined, wherein said signals are related to an identification and direction from a broadcast station towards said object; and
   an object whose position has to be determined comprising:
      a means to measure the phase difference between said omni-directional reference signal and one or more directional signal received; and
      a transponder to receive said omni-directional reference signal and a directional signal and to transmit said phase difference back to a broadcast station, which has sent said directional signal.

26. The system of claim 25 wherein a post-processing unit prepares reports about all objects in identified in an area.

27. The system of claim 25 wherein a post-processing unit initiates actions correspondent to the position of an object whose position has been determined.

28. The system of claim 25 wherein said transponder is switched off after the position of its correspondent object has been determined and is switched on when said object is being moved.

29. The system of claim 25 wherein said directional signals from adjacent broadcast stations are transmitted sequentially to avoid interference.

30. The system of claim 25 wherein relative directional signal strength is used to interpolate a direction in case a transponder receives two directional signals from a same broadcast station.

31. The system of claim 25 wherein an code identifying each broadcast station is embedded in the omni-directional reference signal.

32. The system of claim 25 wherein a calculation of a position of an object is performed by a broadcast station based upon the measurements provided by said transponder.

33. The system of claim 25 wherein a calculation of a position of an object is performed by a post-processing unit based upon the measurements provided by said transponder.

34. The system of claim 25 wherein a calculation of a position of an object is performed by said transponder.

35. The system of claim 25 wherein said means to measure said phase difference is a digital counter.

36. The system of claim 35 wherein said digital counter times the relationship between zero crossings of the omni-directional reference signal and the directional signal using internal clock cycles.

37. The system of claim 25 wherein said means to measure said phase difference uses the ratio between rising crossings of the two signals to the time between rising crossings of the reference signal, followed by averaging multiple measurements.

38. The system of claim 25 wherein said means for measurement of said phase difference delays the reference signal by a variable phase-shift in the analog domain until it coincides with a directional signal, wherein the time-span of this delay is a measure for the phase-shift.

39. The system of claim 25 wherein multiple frequencies are used to identify the broadcast stations.

40. The system of claim 25 wherein the broadcast stations are identified by externally synchronizing the broadcast stations and wherein a broadcast station ID is by turns transmitted and periodically modulated onto the omni-directional reference signal.

41. The system of claim 25 wherein the broadcast station communicate among each other using a wireless network.

42. The system of claim 25 wherein the broadcast station communicate among each other using a LAN network by wire.

43. The system of claim 25 wherein a transponder transmits its identification code and the results of the measurements taken at the object's site.

44. The system of claim 25 wherein for each broadcast stations a post-processing node is provided.

45. The system of claim 25 wherein a transponder is only performing measurement of phase differences and related transmission after a request by a message from a broadcast station, wherein this message is embedded in the omni-directional reference signal.

46. The system of claim 25 wherein a transponder takes the measurement of said phase difference only periodically after a defined time span and transmits the result only when said phase difference is different from a previous measurement.

47. The system of claim 25 wherein a transponder takes the measurement of said phase difference followed by a transmission of the measurement results when a physical movement of its object is sensed by an acceleration sensor.

48. The system of claim 25 wherein a transponder sends an alarm when its battery is losing power.

49. The system of claim 25 wherein more than one of said systems comprising broadcast stations are operated.

50. The system of claim 49 wherein these systems are interconnected by a WLAN network.

51. The system of claim 49 wherein these systems are interconnected by a LAN by wire.

* * * * *